F. C. MITCHELL.

SHIPPING BOX.

APPLICATION FILED FEB. 23, 1909.

Reissued June 1, 1909. 12,968.

WITNESSES.

L. L. Thurer

Alma A. Klug

INVENTOR.

Fred C. Mitchell

By Benedict, Morsell & Caldwell

ATTORNEYS.

UNITED STATES PATENT OFFICE.

FRED C. MITCHELL, OF MILWAUKEE, WISCONSIN.

SHIPPING-BOX.

No. 12,968. Specification of Reissued Letters Patent. Reissued June 1, 1909.

Original No. 893,639, dated July 21, 1908, Serial No. 394,438. Application for reissue filed February 23, 1909. Serial No. 479,674.

*To all whom it may concern:*

Be it known that I, FRED C. MITCHELL, 361 Irving Place, Milwaukee, Wisconsin, have invented a new and useful Improvement in Shipping-Boxes, of which the following is a description, reference being had to the accompanying drawing, which is a part of this specification.

My invention has relation to improvements in shipping boxes, particularly adapted, although not necessarily, for shipping boxes of cigars.

It has been the usual custom to ship boxes of cigars in wooden boxes or cases, the tops thereof being nailed down, and as a further means of securing, a cord has been laced in and out through each and every board of the four sides of the box, the ends of the cords being finally tied together over the top of the box, the two extremities or terminals of the cord which project from the knot being in turn secured together by an ordinary lead seal. Shipping boxes of the character just described are objectionable, not only by reason of the present high price of wood, but also by reason of the fact that the top of a box of the character referred to at the ends thereof is liable to be pried open with a suitable tool, and boxes of cigars thereby surreptitiously removed.

It is the primary object of my invention to provide an improved construction whereby, by the employment of a telescoping form of box, preferably composed of thick cardboard, and a novel arrangement of lacing cord in connection with the outer section or cover of the box, not only is a great saving of expense effected, but at the same time an absolute safe-guard against the surreptitious removal of boxes of cigars is secured.

With the above primary object, and other incidental objects, in view, the invention consists of the devices and parts, or their equivalents, as hereinafter set forth.

Figure 1:
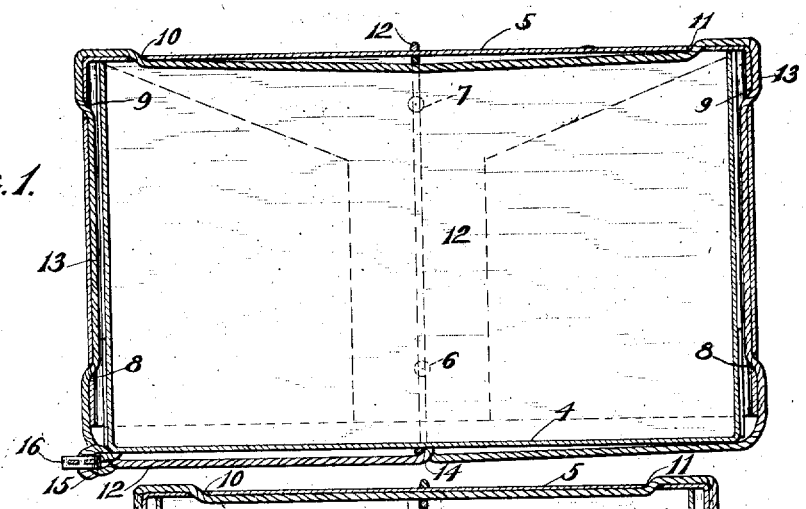
Figure 2:
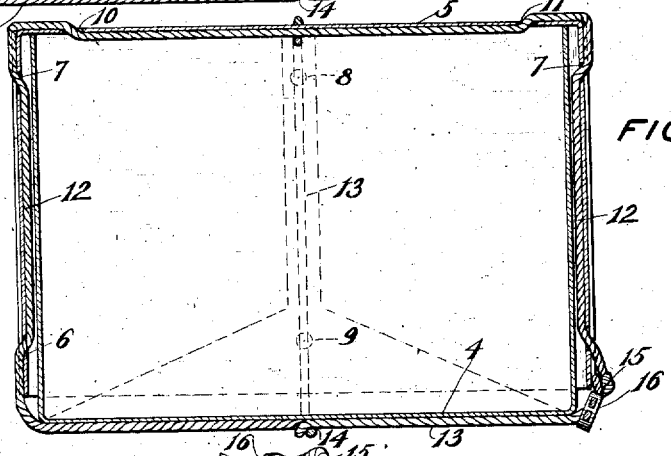
Figure 3:
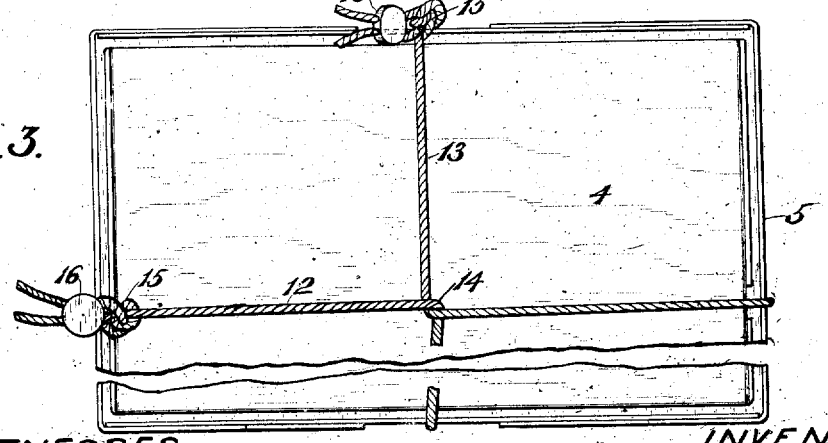

In the accompanying drawing, Figure 1 is a longitudinal sectional view of my invention; Fig. 2 is a transverse sectional view; and Fig. 3 is a bottom view, part being broken away.

Referring to the drawing, the numeral 4 indicates the inner section of a telescoping box, preferably of stiff cardboard, and comprising, as usual, the bottom piece and the upwardly extending side pieces.

The numeral 5 indicates the cover or outer section of the box which comprises, as usual, the top portion and the depending rectangular rim, the latter telescopically fitting the outside of the upwardly extending side pieces of the inner section.

The two opposite sides of the depending rim of the outer section are each provided with lower and upper openings designated, respectively, by the numerals 6 and 7, the two opposite ends with similar lower and upper openings, designated, respectively, by the numerals 8 and 9, and the top of said outer section with openings 10 and 11 respectively, there being two sets of openings, of two openings each, the said several openings located near the outer edges of said top.

Two lacing cords are shown in the drawing. The cord which is laced about the outer section of the box transversely thereof is indicated by the numeral 12, and the cord which is laced about the outer section of the box longitudinally thereof is indicated by the numeral 13. Following the cord 12, it will be seen that it is passed through the lower opening 6 of one of the sides of the outer section of the box, thence upwardly along the inside of said box and out through the upper opening 7, thence over the corner of the top of the outer section and through one of the openings 10 in said top, thence beneath the top and out through one of the openings 11 of the top, thence over the corner of the top, and through the opening 7 in the opposite side of the outer section of the box, thence downwardly along the inner side of said side and out of the lower opening 6, thence around the lower corner of the box and beneath the bottom of the inner section. The other cord 13 is laced in identically the same manner, that is to say, it is passed through the lower opening 8 in one of the ends of the outer section of the box, thence along the inner side of said end, and out through the upper opening 9 of said end, thence around the upper corner of the top of the outer section, thence through the other opening 10 in the top, thence beneath the top, and crossing cord 12, thence out of the other opening 11 in the top, and around the corner of the top, thence inwardly through the opening 9 in the opposite end piece, thence along the inner side of said end piece and out of the lower opening 8, thence around the lower corner of the box and beneath the box. The cords beneath the box are looped, as indicated by the numeral 14, and extended in opposite directions, and the end of one knotted or tied to the end of the other, as indicated by the numeral 15, the extremities of the two cords thus knotted or tied together being in turn secured together by means of a lead seal 16.

It will be seen from the above description that I provide not only an inexpensive form of box or case for shipping goods, but also one in which it is absolutely impossible to remove the contents of the box or case without the outer section of the box being damaged to such an extent as to readily disclose that the box has been tampered with. This form of box will be found of great advantage to shippers, inasmuch as the freight rate is regulated to a considerable extent by the security of the box or case against accessibility to the contents thereof. By the particular arrangement of cords, it will be seen that said cords are not laced through the inner section of the box at all, but solely through the outer section or cover, and as the box or case is of a telescoping form, it will be absolutely impossible, under the arrangement adopted to break open the box unless the cords are cut, or unless the box itself is cut open. It will also be seen that by the particular arrangement of the cords, they intersect each other beneath the top of the cover and they also intersect each other beneath the bottom of the inner section of the box and are looped together at this point, forming a lock, and consequently rendering the box to that extent more secure against surreptitious opening.

What I claim as my invention is:

1. The combination with a shipping box comprising an inner section having a bottom and upwardly extending side pieces, and an outer section comprising a top portion and a rim depending therefrom, said rim adapted to fit the outside of the side pieces of the inner section, and of the same, or substantially the same, height as said side pieces of the inner section, the two sections, when adjusted together constituting a telescoping form of a box, and two of the opposite side pieces of the depending rim of the outer section or cover provided each with a plurality of eyelets, the lower eyelet of each of said side pieces of the rim being located a desired distance above the lower edge of said side piece, and the upper eyelet being located a desired distance below the upper edge of the side piece, and the top of said outer section provided with a plurality of eyelets, one of said eyelets located a desired distance from one of the side edges of the top, and the other eyelet a desired distance from the opposite side edge of the top, of a lacing cord passing through the lower eyelet of one of the depending side pieces of the rim of the cover, thence along the inside of said depending piece and out through the upper eyelet thereof, thence over the upper corner of the box, thence through one of the openings of the top, thence beneath the top, thence out through the other opening and down through the upper eyelet of the opposite depending piece of the rim of the cover, thence along the inside of said depending piece, thence out through the lower opening thereof, thence around the lower corner and beneath the box, the two ends of the cord being finally secured together.

2. The combination with a shipping box comprising an inner section having a bottom and upwardly extending side pieces, and an outer section comprising a top portion and a rim depending therefrom, said rim adapted to fit the outside of the side pieces of the inner section, and of the same, or substantially the same height as said side pieces of the inner section, the two sections, when adjusted together, constituting a telescoping form of box, and each of the sides of the depending rim of the outer section provided with a plurality of eyelets, the lower eyelet of each side piece of the rim being located a desired distance above the lower edge thereof, and the upper eyelet of each side piece being located a desired distance below the upper edge thereof, and the top of said outer section provided with two series of eyelets, one series extending in a line transversely of the other, and one of said eyelets of each series being located a desired distance from one of the side edges of the top, and the other eyelet of a series located a desired distance from the opposite side edge of the top, of lacing cords, each cord being passed through the lower opening of one of the side pieces of the rim of the cover, thence along the inside of said depending piece, and out through the upper opening of said depending piece, thence over the upper corner of the box, thence through one of the openings of the top, thence beneath the top, thence out through the opposite opening of the top, thence around the upper corner and down through the upper eyelet of the opposite side piece of the rim of the cover, thence along the inside of said side piece, thence out through the lower opening thereof, thence around the lower corner and beneath the box, the ends of the cords being finally secured together.

3. The combination with a shipping box comprising an inner section having a bottom and upwardly extending side pieces and an outer section comprising a top portion and a rim depending therefrom, said rim adapted to fit the outside of the side pieces of the inner section, and of the same, or substantially the same, height as said side pieces of the inner section, the two sections, when adjusted together, constituting a telescoping form of box, and each of the sides of the depending rim of the outer section provided with a plurality of eyelets, the lower eyelet of each side piece of the rim being located a desired distance above the lower edge thereof, and the upper eyelet of each side piece being located a desired distance below the upper edge thereof, and the top of said outer section provided with two series of eyelets, one series arranged in a line transversely of the other series, and one of said eyelets of each series being located a desired distance from one of the side edges of the top, and the other eyelet of a series located a desired distance from the opposite side edge of the top, of lacing cords, each cord being passed through the lower opening of one of the side pieces of the rim of the cover, thence along the inside of said depending piece, and out through the upper opening of said depending piece, thence over the upper corner of the box, thence through one of the openings of the top, thence beneath the top, thence out through the opposite opening of the top, thence around the upper corner and down through the upper eyelet of the opposite side piece of the rim of the cover, thence along the inside of said side piece, thence out through the lower opening thereof, thence around the lower corner and beneath the box, the two cords beneath the bottom being looped so as to provide for the end portion of one cord being carried in one direction, and the end portion of the other cord carried in the opposite direction, the opposite ends or terminals of the two cords being secured together.

4. The combination with a shipping box comprising an inner section having a bottom piece and upwardly extending side pieces, and an outer section comprising a top portion and a rim depending therefrom, said rim adapted to fit the outside of the side pieces of the inner section, and of the same, or substantially the same, height as said side pieces of the inner section, the two sections, when adjusted together, constituting a telescoping form of box, and each of the sides of the depending rim of the outer section provided with a plurality of eyelets, the lower eyelet of each side piece of the rim being located a desired distance above the lower edge thereof, and the upper eyelet of each side piece being located a desired distance below the upper edge thereof, and the top of said outer section provided with two series of eyelets, one series extending in a line transversely of the other, and one of said eyelets of each series being located a desired distance from one of the side edges of the top, and the other eyelet of a series located a desired distance from the opposite side edge of the top, of a cord arrangement laced solely through the cover section, and having one portion extending in one direction around said cover section, and another portion extending around the cover section in another direction, the portion in each direction being laced or threaded in and out through the eyelets of the cover so that portions of the cord will be on the outside of the cover and portions between the walls of the cover and inner section, the portions being carried beneath the bottom of the box, and the ends thereof secured together.

5. The combination with a shipping box comprising an inner section having a bottom piece, and upwardly extending side pieces, and an outer section comprising a top portion and a rim depending therefrom, said rim adapted to fit the outside of the side pieces of the inner section, and of the same, or substantially the same, height as said side pieces of the inner section, the two sections, when adjusted together, constituting a telescoping form of box, and each of the sides of the depending rim of the outer section provided with a plurality of eyelets, the lower eyelet of each side piece of the rim being located a desired distance above the lower edge thereof, and the upper eyelet of each side piece being located a desired distance below the upper edge thereof, and the top of said outer section provided with two series of eyelets, one series extending in a line transversely of the other, and one of said eyelets of each series being located a desired distance from one of the side edges of the top, and the other eyelet of a series located a desired distance from the opposite side edge of the top, of a cord arrangement laced solely through the cover section, and having one portion extending in one direction around said cover section, and another portion extending around the cover section in another direction, the portion in each direction being laced or threaded in and out through the eyelets of the cover so that portions of the cord will be on the outside of the cover and portions between the walls of the cover and inner section, the portions crossing each other beneath the bottom of the box, and the ends thereof secured together.

6. The combination with a shipping box comprising an inner section having a bottom piece and upwardly extending side pieces, and an outer section comprising a top portion and a rim depending therefrom, said rim adapted to fit the outside of the side pieces of the inner section, and of the same, or substantially the same, height as said side pieces of the inner section, the two sections, when adjusted together, constituting a telescoping form of box, and each of the sides of the depending rim of the outer section provided with a plurality of eyelets, the lower eyelet of each side piece of the rim being located a desired distance above the lower edge thereof, and the upper eyelet of each side piece being located a desired distance below the upper edge thereof, and the top of said outer section provided with two series of eyelets, one series extending in a line transversely of the other, and one of said eyelets of each series being located a desired distance from one of the side edges of the top, and the other eyelet of a series located a desired distance from the opposite side edge of the top, of a cord arrangement laced solely through the cover section, and having one portion extending in one direction around said cover section, and another portion extending around the cover section in another direction, the portion in each direction being laced or threaded in and out through the eyelets of the cover so that portions of the cord will be on the outside of the cover and portions between the walls of the cover and the inner section, the portions crossing each other beneath the bottom of the box and looped together at the point of intersection to form an interlocking of the portions one with the other, the ends of the portions being finally secured together.

7. The combination with a shipping box comprising an inner section having a bottom piece and upwardly extending side pieces, and an outer section comprising a top portion and a rim depending therefrom, said rim adapted to fit the outside of the side pieces of the inner section, and of the same, or substantially the same, height as said side pieces of the inner section, the two sections, when adjusted together constituting a telescoping form of box, and each of the sides of the depending rim of the outer section provided with a plurality of eyelets, the lower eyelet of each side piece of the rim being located a desired distance above the lower edge thereof, and the upper eyelet of each side piece being located a desired distance below the upper edge thereof, and the top of said outer section provided with a series of eyelets, one series extending in a line transversely of the other, and one of said eyelets of each series being located a desired distance from one of the side edges of the top, and the other eyelet of a series located a desired distance from the opposite side edge of the top, of a cord arrangement laced solely through the cover section, and having one portion extending in one direction around said cover section, and another portion extending around the cover section in another direction, the portion in each direction being laced or threaded in and out through the eyelets of the cover so that portions of the cord will be on the outside of the cover and portions between the walls of the cover and the inner section, the portions crossing each other on the inside of the top of the cover and also crossing each other beneath the bottom of the box, the ends of the portions being finally secured together.

FRED C. MITCHELL.

Witnesses:
A. L. MORSELL,
ALMA A. KLUG.